(12) United States Patent
Swartz et al.

(10) Patent No.: US 11,089,503 B2
(45) Date of Patent: Aug. 10, 2021

(54) AUTOMATED ADJUSTMENT OF NETWORK PARAMETERS BASED ON SENSOR STATISTICS

(71) Applicant: Cisco Technology, Inc., San Jose, CA (US)

(72) Inventors: John M. Swartz, Lithia, FL (US); Joshua D. Suhr, Lenexa, KS (US); Matthew A. Silverman, Shaker Heights, OH (US); Vishal S. Desai, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 24 days.

(21) Appl. No.: 16/737,824

(22) Filed: Jan. 8, 2020

(65) Prior Publication Data

US 2021/0211921 A1 Jul. 8, 2021

(51) Int. Cl.
*H04L 12/26* (2006.01)
*H04W 24/02* (2009.01)
(Continued)

(52) U.S. Cl.
CPC ..... *H04W 28/0231* (2013.01); *H04L 43/0823* (2013.01); *H04L 43/0894* (2013.01);
(Continued)

(58) Field of Classification Search
CPC . H04L 43/0823; H04L 43/0894; H04L 84/18; H04W 24/02; H04W 28/0231; H04W 12/06; H04W 24/08; H04W 48/12
(Continued)

(56) References Cited

U.S. PATENT DOCUMENTS 7,423,990 B2 9/2008 Kelton et al.
8,085,733 B2 12/2011 Roy et al.
(Continued)

FOREIGN PATENT DOCUMENTS

TW I423625 B 1/2014

OTHER PUBLICATIONS

U.S. Appl. No. 16/133,580 "Threshold Optimization for Overlapping Basic Service Sets in a Wireless Network," as filed on Sep. 17, 2018.
(Continued)

*Primary Examiner* — Gbemileke J Onamuti
(74) *Attorney, Agent, or Firm* — Patterson + Sheridan, LLP (57) ABSTRACT

Techniques for automated network adjustment are provided. A first data rate currently supported by a first access point is determined, and a second data rate is identified to be evaluated. A first sensor device of a plurality of sensor devices is identified, where a signal strength between the first sensor device and the first access point exceeds a predefined threshold. A first packet error rate is determined for communications between the first sensor device and the first access point using the first data rate, and a second packet error rate is determined for communications between the first sensor device and the first access point using the second data rate. Upon determining that the second packet error rate is lower than the first packet error rate, the first access point is automatically reconfigured to use the second data rate.

20 Claims, 6 Drawing Sheets

(51) Int. Cl.
    *H04W 28/02* (2009.01)
    *H04W 48/12* (2009.01)
    *H04W 12/06* (2021.01)
    *H04W 24/08* (2009.01)
    *H04W 84/18* (2009.01)

(52) U.S. Cl.
    CPC ............ *H04W 24/02* (2013.01); *H04W 12/06* (2013.01); *H04W 24/08* (2013.01); *H04W 48/12* (2013.01); *H04W 84/18* (2013.01)

(58) Field of Classification Search
    USPC .......................................................... 370/253
    See application file for complete search history.

(56) References Cited

U.S. PATENT DOCUMENTS

| | | | |
|---|---|---|---|
| 8,203,940 | B1 | 6/2012 | Yuan et al. |
| 8,520,677 | B2 | 8/2013 | Zhang et al. |
| 8,565,081 | B1 | 10/2013 | Yuan et al. |
| 9,077,486 | B1 | 7/2015 | Yuan et al. |
| 9,629,170 | B1 | 4/2017 | Yuan et al. |
| 10,412,617 | B2 | 9/2019 | Pandey et al. |
| 2002/0193135 | A1* | 12/2002 | Nakano ................. H04W 52/40 455/524 |
| 2013/0259016 | A1* | 10/2013 | Xhafa ..................... H04W 4/80 370/338 |

OTHER PUBLICATIONS

U.S. Appl. No. 16/560,604, "Cell edge sensitivity automation method," filed on Sep. 4, 2019.

U.S. Appl. No. 16/293,218 "Optimization in Wireless Networks Using Sensor Nodes and Actual Packet Collision Measurements," filed on Mar. 5, 2019.

U.S. Appl. No. 16/505,105 "BSS Color Assignment in Infrastructure WLANs," filed on Jul. 8, 2019.

U.S. Appl. No. 16/120,270 "Managing Coverage Areas Provided by Densely-Arranged Wireless Endpoint Devices with Directional Antennas," filed on Sep. 2, 2018.

* cited by examiner

AUTOMATED ADJUSTMENT OF NETWORK PARAMETERS BASED ON SENSOR STATISTICS

TECHNICAL FIELD

Embodiments presented in this disclosure generally relate to wireless networks. More specifically, embodiments disclosed herein relate to automatic evaluation and optimization of wireless networks.

BACKGROUND

In many environments, wireless networks are deployed to provide connectivity to client devices. These networks can consist of any number of access points (APs) placed around the space. For example, a coffee shop may provide 802.11 network access (e.g., a WiFi network) using a number of wireless routers placed in the store. There are a large number of parameters that can (and should) be tuned when deploying and optimizing a network. If these parameters are not tuned, the network can operate sub-optimally, and fail to provide adequate connectivity.

For example, the minimum mandatory data rate, which defines the speed with which data is transmitted over the network, has a significant effect on the performance and availability of the network. If the rate is too high, the noise floor of the environment can reach a level that reduces the signal-to-noise ratio to a point where client devices can no longer successfully decode beacons from the APs. Similarly, if the rate is too low, the performance of the network suffers as a large portion of the available airtime is consumed by management traffic, leaving little airtime for actual data packets to be successfully transmitted.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

One embodiment presented in this disclosure is a method. The method includes determining a first data rate currently supported by a first access point, and identifying a second data rate to be evaluated. The method further includes identifying a first sensor device of a plurality of sensor devices, wherein a signal strength between the first sensor device and the first access point exceeds a predefined threshold. Additionally, the method includes determining a first packet error rate for communications between the first sensor device and the first access point using the first data rate, and determining a second packet error rate for communications between the first sensor device and the first access point using the second data rate. Upon determining that the second packet error rate is lower than the first packet error rate, the method also includes automatically reconfiguring the first access point to use the second data rate.

Another embodiment presented in this disclosure is a non-transitory computer-readable storage medium. The computer-readable storage medium contains computer program code that, when executed by operation of one or more computer processors, performs an operation. The operation includes determining a first data rate currently supported by a first access point, and identifying a second data rate to be evaluated. The operation further includes identifying a first sensor device of a plurality of sensor devices, wherein a signal strength between the first sensor device and the first access point exceeds a predefined threshold. Additionally, the operation includes determining a first packet error rate for communications between the first sensor device and the first access point using the first data rate, and determining a second packet error rate for communications between the first sensor device and the first access point using the second data rate. Upon determining that the second packet error rate is lower than the first packet error rate, the operation also includes automatically reconfiguring the first access point to use the second data rate.

Another embodiment presented in this disclosure is a system. The system includes one or more computer processors, and a memory. The memory contains a program which, when executed by the one or more computer processors, performs an operation. The operation includes determining a first data rate currently supported by a first access point, and identifying a second data rate to be evaluated. The operation further includes identifying a first sensor device of a plurality of sensor devices, wherein a signal strength between the first sensor device and the first access point exceeds a predefined threshold. Additionally, the operation includes determining a first packet error rate for communications between the first sensor device and the first access point using the first data rate, and determining a second packet error rate for communications between the first sensor device and the first access point using the second data rate. Upon determining that the second packet error rate is lower than the first packet error rate, the operation also includes automatically reconfiguring the first access point to use the second data rate.

EXAMPLE EMBODIMENTS

Embodiments of the present disclosure provide techniques to probe networks in order to evaluate the network configuration and adjust or optimize parameters to improve the functionality of the network. For example, embodiments of the present disclosure can improve the signal-to-noise ratio of the network, reduce management and control frame overhead (e.g., by expanding the ratio of traffic that includes substantive data), and ensure the network operates efficiently and reliably at any given time. In some embodiments, the system can respond in real-time to changes in the network (e.g., as the number and type of client devices change, and the type and volume of traffic shifts).

In some embodiments, one or more sensor devices are deployed in the environment to monitor the network in use by client devices, in order to optimize network parameters. In one such embodiment, the sensor devices act as test clients to probe the network. In an embodiment, the sensors are used to probe the effect of data rate changes on the network. For example, if the majority of data packets are sent well above the minimum mandatory data rate, the network is healthy and functionality may be improved by raising the rate. In contrast, if the majority of packets are transmitted at or below the data rate, and/or retries are incrementing, the system may determine that the network is struggling. A more stable network can be achieved by lowering the data rate during periods of high contention, channel utilization, and/or high noise floor.

In one embodiment of the present disclosure, the system causes the sensors to run regularly scheduled tests against their neighbor APs in order to generate recommended parameter changes (e.g., a higher or lower data rate) to stabilize the network and improve throughput and performance. In one such embodiment, these recommendations are automatically implemented without user intervention, enabling the network to react to shifting scenarios over time. In some embodiments, the suggestions are provided to a user for authorization and implementation.

Figure 1:
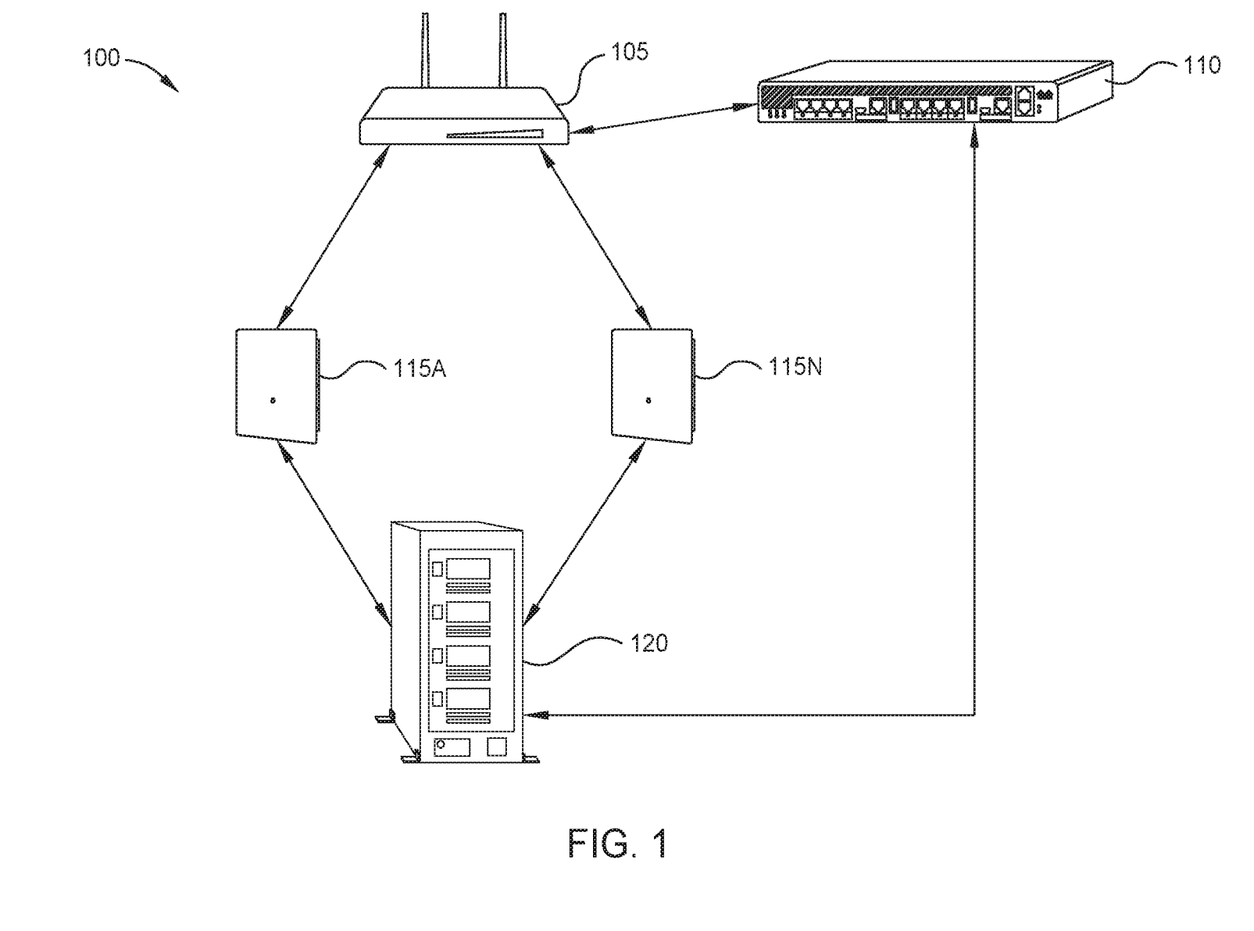
FIG. 1 depicts an environment configured to use sensor devices to evaluate and optimize wireless networks, according to one embodiment disclosed herein.

FIG. 1 depicts an environment 100 configured to use sensors devices to evaluate and optimize wireless networks, according to one embodiment disclosed herein. In the illustrated embodiment, an AP 105 is communicatively coupled with one or more Sensors 115. Although not depicted in the illustrated embodiment, the environment 100 can additionally include any number of client devices (e.g., laptops, smart phones, desktop computers, tablets, and the like). In an embodiment, the AP 105 provides network connectivity to the connected devices. Although a single AP 105 is depicted, in embodiments, there may of course be any number of APs 105 that collectively provide connectivity. In embodiments, the APs 105 may provide access to a local network, broader networks (e.g., the Internet), and the like. In one embodiment, at least a portion of the network is wireless.

Although two Sensors 115A-N are illustrated, in embodiments, any number of Sensors 115 can be deployed in the space. Further, each Sensor 115 may be in communication with any number of APs 105. In embodiments, the Sensors 115A-N are validated and authorized to communicate with the APs 105 using non-standard configurations. For example, if the AP 105 is currently configured to advertise or offer a given data rate, the Sensors 115 can nevertheless force the AP 105 to communicate at a different data rate that is not otherwise supported for client devices. That is, while the AP 105 communicates with client devices at a first data rate, the Sensors 115 can communicate with the AP 105 at a different rate, regardless of the rate used for clients.

In the illustrated embodiment, the Sensors 115 are also communicatively coupled with a Network Controller 120. The Network Controller 120 can initiate tests or evaluations of the network periodically or on demand, and evaluate the resulting data to generate suggested or recommended parameters to improve connectivity. In one embodiment, the Network Controller 120 does so by instructing one or more of the Sensors 115 to communicate with one or more APs 105 at a specified data rate (e.g., the current data rate, and/or one or more other data rates). The Sensors 115 can record data about the transmissions (e.g., the error rate, the retry rate, and the like) and return these results to the Network Controller 120. In a related embodiment, the APs 105 record these results and transmit them to the Network Controller 120.

In one embodiment, the Network Controller 120 instructs the Sensors 115 to exchange a predefined number of packets at a specified data rate, to ensure adequate data is returned for evaluation. In some embodiments, the Network Controller 120 initiates tests to sweep across the potential data rates that can be used, using the Sensors 115. As discussed above, in embodiments, the Sensors 115 connect to the APs 105 using a special agreement that enables communication at any data rate, regardless of the AP 105 supported rates. To allow this, in one embodiment, the Sensors 115 are authenticated and/or validated by a network security entity.

In an embodiment, the AP 105 and Sensors 115 exchange packets at various data rates to collect performance metrics including packet error rates, received signal strength indicators (RSSI), and the like. In some embodiments, the test records further include an indication of the physical location of the AP 105 and/or Sensor 115. This can enable the Network Controller 120 to generate updated parameters with consideration for the physical environment (e.g., paying special attention to data collected by Sensors 115 located proximate to the AP 105, or in locations where client devices are likely to be located).

In the illustrated embodiment, the Network Controller 120 aggregates and evaluates the data to adjust the mandatory and supported rates as needed. In some embodiments, the Network Controller 120 evaluates the data on a per-AP 105 basis. That is, the Network Controller 120 determines optimal data rates separately for each AP 105. In another embodiment, the Network Controller 120 evaluates collections of APs 105 (e.g., AP groups, RF groups or profiles, APs 105 in similar areas of the space, and the like) to identify and suggest parameters for the collection.

In one embodiment, the system evaluates test records that indicate the error rate for each combination of AP 105, Sensor 115, and data rate. That is, a record PER(i,j,k) indicates the packet error rate for communications between AP(i) and Sensor(j) at DataRate(k). In some embodiments, the records further include the RSSI(i,j,k), which indicates the RSSI of the communications between AP(i) and Sensor (j) at DataRate(k). In an embodiment, the Network Controller 120 can then evaluate the data to identify sensor/AP pairs with a minimum RSSI, in order to avoid consideration of sensors that are too far to reliably contribute to the rate decision.

Among each of the remaining sensor/AP combinations (i,j), in one embodiment, the Network Controller 120 can sweep across k to find the maximum rate where PER(i,j,k) is below a predefined threshold. That is, the Network Controller 120 can find the maximum DataRate(k) where PER (:,:,k) is below a threshold value. In some embodiments, upon identifying this maximum allowable data rate, the Network Controller 120 is further configured to provide some margin (e.g., in case the noise floor increases) by selecting the immediately-lower rate. Additionally, in some embodiments, the Network Controller 120 employs a filter or other techniques to avoid large changes in the supporter data rate. For example, suppose the network employs discrete data rates one through eight, where eight is the highest rate. In one such embodiment, the Network Controller 120 ensures that the system iteratively steps one rate at a time (e.g., from rate five to rate six), rather than making drastic changes at once (e.g., from five to eight).

In the illustrated embodiment, once the data rate is determined, the network Controller 120 interfaces with a Wireless Controller 110, instructing it to set the new mandatory data rate for one or more APs 105 to the determined optimal rate. The Wireless Controller 110 then does so. In another embodiment, the Network Controller 120 instead directly interacts with the APs 105 to reconfigure them to the new rates. In yet another embodiment, the new rates are provided to a user or administrator that approves them prior to implementation.

In an embodiment, this evaluation process can be repeated periodically (e.g., hourly, daily, and the like) or on demand (e.g., at the instruction of a user) to ensure the system maintains high functionality as the client load shifts. For example, as client devices enter and exit the environment 100 and the traffic increases and decreases, the noise floor and other performance metrics can shift, causing the currently-supported data rate to be suboptimal. By actively using Sensors 115 to probe the network, the Network Controller 120 can more readily and accurately respond to these changing scenarios.

Figure 2:
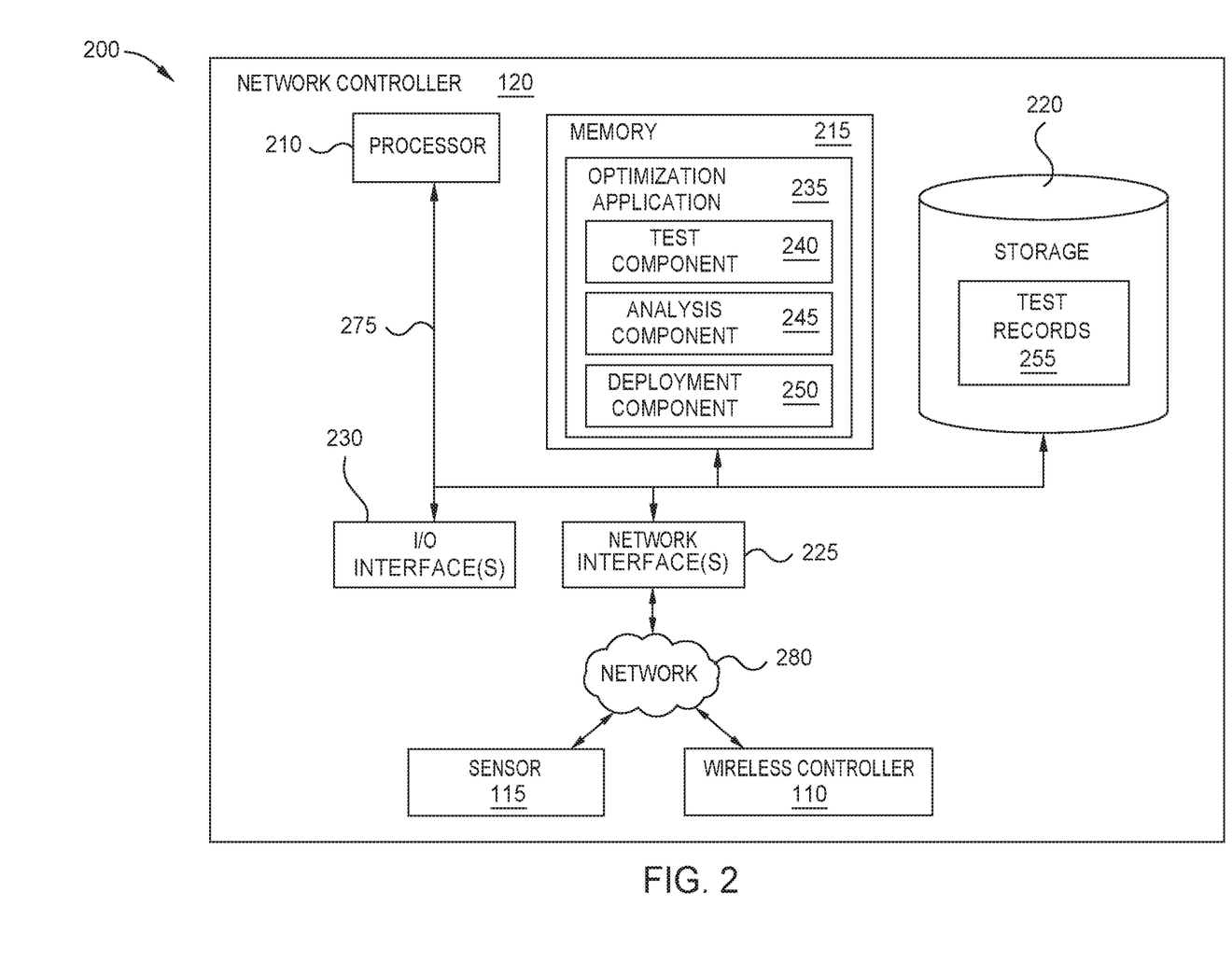
FIG. 2 is a block diagram illustrating a network controller configured to automatically evaluate network connectivity and adjust parameters to improve the network, according to one embodiment disclosed herein.

FIG. 2 is a block diagram illustrating a Network Controller 120 configured to automatically evaluate network connectivity and adjust parameters to improve the network, according to one embodiment disclosed herein. Although depicted as a physical device, in embodiments, the Network Controller 120 may be implemented using virtual device(s), and/or across a number of devices (e.g., in a cloud environment). As illustrated, the Network Controller 120 includes a Processor 210, Memory 215, Storage 220, a Network Interface 225, and one or more I/O Interfaces 230. In the illustrated embodiment, the Processor 210 retrieves and executes programming instructions stored in Memory 215, as well as stores and retrieves application data residing in Storage 220. The Processor 210 is generally representative of a single CPU and/or GPU, multiple CPUs and/or GPUs, a single CPU and/or GPU having multiple processing cores, and the like. The Memory 215 is generally included to be representative of a random access memory. Storage 220 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, input and output devices (such as keyboards, monitors, etc.) are connected via the I/O Interface(s) 230. Further, via the Network Interface 225, the Network Controller 120 can be communicatively coupled with one or more other devices and components (e.g., via the Network 280, which may include the Internet, local network(s), and the like). Additionally, the Network 280 may include wired connections, wireless connections, or a combination of wired and wireless connections. In the illustrated embodiment, the Network Controller 120 is communicatively coupled with a set of Sensors 115, and a Wireless Controller 110 used to configure one or more APs. Further, as illustrated, the Processor 210, Memory 215, Storage 220, Network Interface(s) 225, and I/O Interface(s) 230 are communicatively coupled by one or more Buses 275.

In the illustrated embodiment, the Storage 220 includes a set of Test Records 255. Although depicted as residing in Storage 220, in embodiments, the Test Records 255 can reside in any suitable location. The Test Records 255 are generated during evaluation or probing of the network, and indicate, for a given AP/sensor/bitrate combination, the RSSI and determined error rate. In one embodiment, the error rate is based at least in part on the retry rate. The retry rate refers to the percentage of packets that were not successfully transmitted on the first attempt (e.g., the percentage of packets that required at least one retry). In some embodiments, the error rate is further based on the beacons detected. For example, given a configured beacon interval (e.g., a length of time between beacons or a number of beacons to transmit per minute), the error rate can reflect the number of beacons from the AP that the sensor detected (e.g., the number that were not lost in the noise floor), as compared to the number of beacons that were transmitted by the AP.

As illustrated, the Memory 215 includes an Optimization Application 235. Although depicted as software residing in Memory 215, in embodiments, the functionality of the Optimization Application 235 can be implemented using software, hardware, or a combination of software and hardware. In the illustrated embodiment, the Optimization Application 235 includes a Test Component 240, an Analysis Component 245, and a Deployment Component 250. Although depicted as discrete components for conceptual clarity, in embodiments, the operations of the Test Component 240, Analysis Component 245, and Deployment Component 250 can be combined or distributed across any number of components.

In an embodiment, the Test Component 240 initiates evaluations of the network. In one embodiment, the Test Component 240 periodically initiates test based on a predefined timeline (e.g., daily, hourly, weekly, and the like). In some embodiments, the Test Component 240 uses a predefined schedule (e.g., specified times and/or dates at which to probe the network). In still another embodiment, a user or administrator can manually instruct the Test Component 240 to initiate a test. In one embodiment, the Test Component 240 initiates the test by identifying the available Sensors 115 in the network, and transmitting one or more instructions requesting that they each communicate with the AP(s) that are visible to them using a specified data rate.

In an embodiment, the Test Component 240 instructs each Sensor 115 to, for each visible AP, exchange data with the AP (1) using the advertised or currently-configured data rate supported by the AP, and (2) using one or more other data rates specified by the Test Component 240. In some embodiments, this includes instructing the Sensor 115 to exchange a predefined number of packets at the specified data rate(s). In one embodiment, if the data rates are defined as a set of discrete options, the Test Component 240 instructs each Sensor 115 to exchange data at each possible data rate. In another embodiment, the Test Component 240 instructs the Sensors 115 to test at the current data rate, as well as the immediately adjacent rate (e.g., one step higher and/or one step lower). Additionally, in some embodiments, the Test Component 240 instructs the AP(s) to initiate the test with the visible Sensors 115, in addition to or instead of instructing the Sensors 115 to begin the tests.

In an embodiment, to perform the test, the Sensors 115 exchange the specified number of packets (or exchange data for the specified period of time) with the visible AP(s) using the specified data rate(s). During this interaction, the Sensors 115 and/or APs collect performance metrics for each data rate, such as the RSSI at the Sensor 115 and/or AP when using the evaluated data rate, the error rate of the transmissions, the ratio of beacons that are detected, and the like. This data is returned to the Test Component 240, and stored as Test Records 255 for future evaluation. In some embodiments, in addition to specifying the AP/Sensor/Data Rate combination, each Test Record 255 further specifies the time(s) when the data was collected. This can allow the Network Controller 120 and/or users to infer periods when the network performance is likely to shift (e.g., when large events such as conferences are occurring, during certain times of day, and the like).

In the illustrated embodiment, the Analysis Component 245 then evaluates the Test Records 255 in order to determine, for each AP and/or collection of APs, an optimal mandatory minimum data rate. In one embodiment, the Analysis Component 245 does so by first identifying, for each AP or group of APs, a subset of the Test Records 255 that reflect a sufficiently high RSSI. In this way, the Analysis Component 245 refrains from considering data collected using Sensors 115 that are too far away from the AP (or are obstructed), which may lead to inaccurate results. The Analysis Component 245 can then determine the highest data rate with a corresponding error rate below a predefined threshold, and classify this data rate as the optimal rate.

In one embodiment, the Analysis Component 245 only suggests a new data rate if each aspect of the error rate improved. For example, if the new data rate resulted in improved delivery success as well as improved retry rate, the Analysis Component 245 can suggest this new rate. In contrast, if either the delivery success or the retry rate were not improved (or worsened), the Analysis Component 245 can determine to maintain the current data rate.

In one embodiment, for a given AP, the Analysis Component 245 can aggregate the Test Records 255 provided by multiple Sensors 115 in order to determine an aggregate or overall optimal data rate. For example, if a first AP is communicatively coupled with two Sensors 115A and 115B, the Analysis Component 245 can combine the Test Records 255 provided by the Sensors 115A and 115B when evaluating the AP. In one embodiment, this aggregation includes averaging the error rates reported by each Sensor 115A-B. In another embodiment, the aggregation includes determining the maximum error rate reported by the Sensors 115A-B. This can prevent the Analysis Component 245 from selecting a data rate that will harm the Sensor 115 with the worst error rate.

Additionally, in one embodiment, if the Analysis Component 245 is evaluating a collection of APs, the Analysis Component 245 can similarly aggregate data related to each of the APs in the group. For example, after determining an aggregate error rate at a given data rate for each AP, the Analysis Component 245 can aggregate these aggregated rates to determine an overall error rate for the group of APs, with respect to the given data rate. In this way, the Analysis Component 245 can automatically evaluate the network stability and performance using Sensors 115 to actively probe the network at specified rates.

In the illustrated embodiment, once the Analysis Component 245 determines the optimal rate for a given AP or set of APs, the Deployment Component 250 implements it. In one embodiment, this includes providing the recommend data rate (or other parameters and configurations) to a user or administrator for approval. In another embodiment, the Deployment Component 250 proceeds to implement the change without requiring user intervention. In at least one embodiment, the Deployment Component 250 instructs a Wireless Controller 110 or other device to reconfigure the relevant AP(s) in order to implement the change. In another embodiment, the Deployment Component 250 itself directly interfaces with the relevant AP(s).

Figure 3:
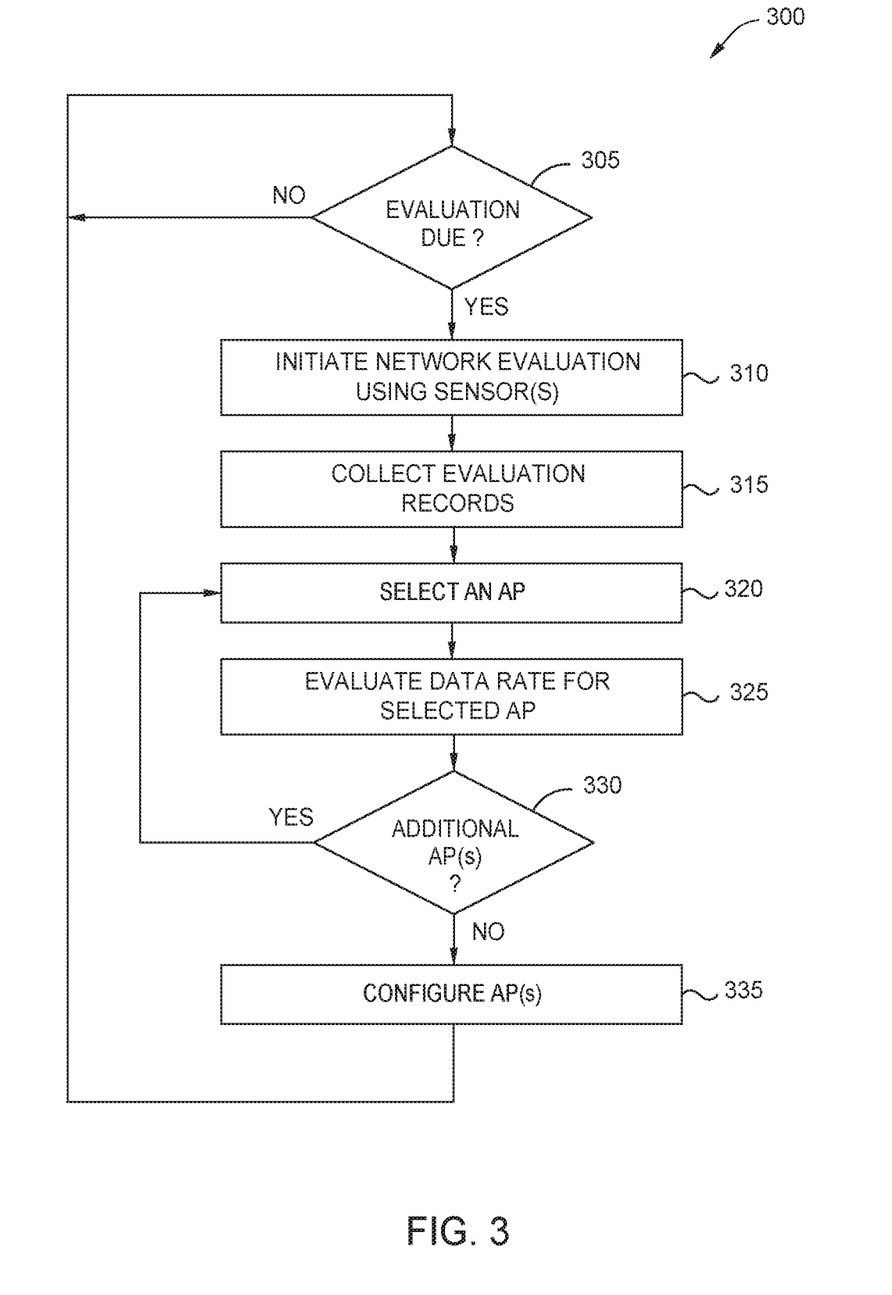
FIG. 3 is a flow diagram illustrating a method for automatically evaluating and configuring network parameters to improve operations, according to one embodiment disclosed herein.

FIG. 3 is a flow diagram illustrating a method 300 for automatically evaluating and configuring network parameters to improve operations, according to one embodiment disclosed herein. The method 300 begins at block 305, where a Network Controller 120 determines whether an evaluation is due. This can include, for example, determining whether a scheduled time for evaluation has arrived, whether a predefined period of time has elapsed since the last evaluation, whether a user has initiated an evaluation, and the like.

If no evaluation is due, the method 300 loops at block 305 until one is begun. If an evaluation is due, however, the method 300 continues to block 310, where the Network Controller 120 initiates the evaluation using the available sensors. In one embodiment, as discussed above, this includes transmitting, to each sensor, an instruction to exchange data with its neighboring APs using one or more specified data rates. The sensors then collect error and performance data during these exchanges. Once sufficient data is available, the method 300 continues to block 315 where the Network Controller 120 collects or retrieves evaluation records (also referred to as Test Records 255) from the sensors.

As discussed above, in one embodiment, each evaluation record indicates the relevant AP/sensor combination, as well as the RSSI during the test, and the data rate used during the test. The record further indicates the error rate perceived during the test, which can include the retry rate, the beacon success rate, the delivery success rate, and the like. The method 300 then proceeds to block 320, where the Network Controller 120 selects an AP (or predefined collection of APs). At block 325, the Network Controller 120 identifies the relevant records (e.g., the records that relate to exchanges with the selected AP or with an AP in the selected group of APs), and evaluates the records to determine an optimal data rate.

In one embodiment, this includes evaluating the current data rate in order to compare its performance to other data rates (e.g., immediately adjacent rates). On embodiment of this is discussed in more detail below with reference to FIG. 4. After evaluating the data rate to determine an optimal or suggested rate for the selected AP or group of APs, the method 300 continues to block 330, where the Network Controller 120 determines whether there is at least one additional AP or group of APs yet to be evaluated. If so, the method 300 returns to block 320. Otherwise, the method 300 continues to block 335, where the Network Controller 120 configures the APs as needed, given the determined data rates.

For example, in one embodiment, if the Network Controller 120 has determined that the mandatory minimum data rate of any of the APs should be changed, the Network Controller 120 requests that a user approve the modification. In another embodiment, the Network Controller 120 implements the change (e.g., by interfacing with a Wireless Controller 110 responsible for the relevant AP(s)). The method 300 then returns to block 305, and the process repeats in order to ensure the network is automatically adjusted to respond to shifting conditions.

Figure 4:
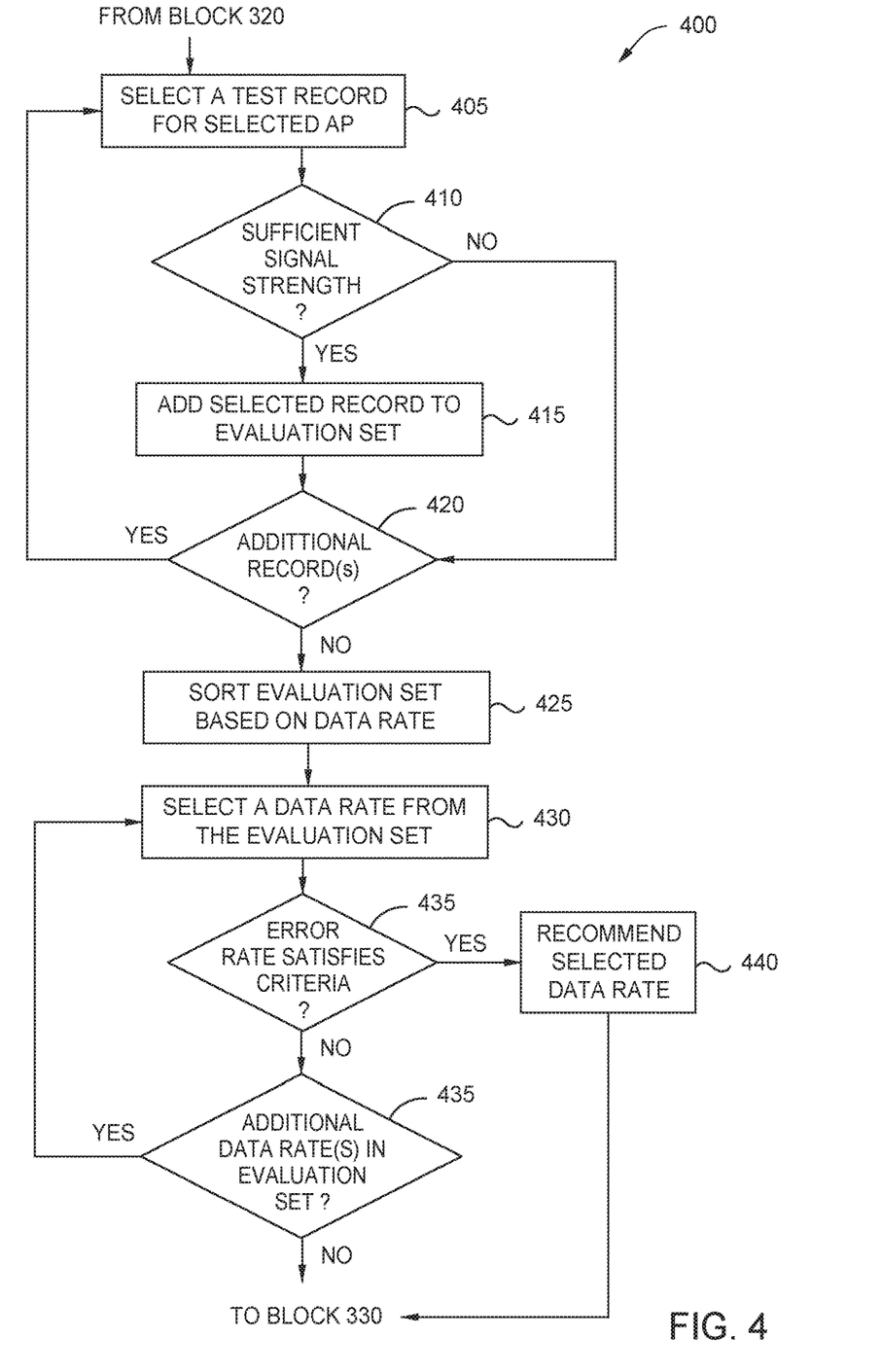
FIG. 4 is a flow diagram illustrating method for evaluating network data to identify improved parameters, according to one embodiment disclosed herein.

FIG. 4 is a flow diagram illustrating method 400 for evaluating network data to identify improved parameters, according to one embodiment disclosed herein. In the illustrated embodiment, the method 400 provides additional detail for block 325 in FIG. 3. The method 400 begins at block 405, where the Network Controller 120 selects one of the test records relevant to the selected AP (or relevant to an AP in the group of APs). In one embodiment, this includes identifying the set of records that were generated based on data exchanges with the selected AP. The method 400 then continues to block 410.

At block 410, the Network Controller 120 determines whether the selected record reflects sufficient signal strength for consideration. This can include, for example, comparing the RSSI indicated by the record with a predefined minimum threshold. That is, the Network Controller 120 may exclude and/or delete records below a minimal signal strength, because these records were likely collected by sensors that are not representative of typical client devices. For example, if the sensor is far away from the AP (or there are one or more obstacles between the AP and the sensor), the RSSI is likely to be relatively lower than would be seen by a typical client device in the space. Such a sensor is likely to also experience worse than expected performance when connecting to the AP (as opposed to other nearby APs).

If the selected record is not reliable (e.g., due to insufficient signal strength), the method 400 proceeds to block 420. Returning to block 410, if the Network Controller 120 determines that the strength of the selected record is sufficient, the method 400 continues to block 415. At block 415, the Network Controller 120 adds the selected record to the evaluation set. The evaluation set is the subset of test records that will be used to evaluate the performance of the selected AP (or group of APs). The method 400 then continues to block 420.

At block 420, the Network Controller 120 determines whether there is at least one additional relevant record that has not yet been evaluated. If so, the method 400 returns to block 405. Otherwise, the method 400 continues to block 425, the Network Controller 120 sorts or ranks the records in the evaluation set based on their corresponding data rates. For example, in one embodiment, the Network Controller 120 sorts the records by data rate, in descending order. That is, the first record corresponds to the highest data rate that was tested, and the last record corresponds to the lowest data rate that was tested.

In one embodiment, if multiple records exist for a given data rate (e.g., because multiple sensors interacted with the selected AP, and/or because multiple APs are included in the selected group), the Network Controller 120 first aggregates the records, as discussed above. In an embodiment, the Network Controller 120 does so by determining an average, minimum, maximum, or other representative value for the error rate, with respect to each data rate, for the selected AP or group of APs.

For example, suppose the selected AP group includes APs A and B, and the test records reflect exchanges between each AP and sensors Y and Z. That is, the evaluation set includes, for each data rate being tested, a record for A-Y, A-Z, B-Y, and B-Z. For a given data rate, the Network Controller 120 can determine an aggregate error rate N for AP A by aggregating A-Y and A-Z, and an aggregate error rate M for AP B by aggregating B-Y and B-Z. The Network Controller 120 can then determine an overall error rate for the AP group of A and B, with respect to the given data rate, by aggregating N and M.

Once the records are sorted and aggregated as needed, the method 400 continues to block 430, where the Network Controller 120 selects a data rate reflected in the sorted evaluation set. In one embodiment, the Network Controller 120 initially selects the first (e.g., the highest) data rate, and iteratively proceeds to lower rates until a satisfactory one is identified. At block 435, the Network Controller 120 determines the error rate for the selected AP or AP group at the selected data rate, as reflected in the selected record(s). The Network Controller 120 further determines whether this error rate satisfies predefined performance criteria.

In one embodiment, the criteria include thresholds of performance, such as a minimum throughput, maximum retry rate, and the like. In another embodiment, the criteria correspond to the error rate of the currently-supported data rate. That is, the comparison at block 435 can include determining whether the selected data rate improves over the current rate. If the Network Controller 120 determines that the error rate of the selected data rate satisfies the criteria, the method 400 continues to block 440, where the Network Controller 120 recommends this selected data rate (e.g., by classifying it as the optimal or efficient data rate for the selected AP or group of APs).

In one embodiment, rather than returning the selected rate, the Network Controller 120 instead selects the immediately-adjacent lower rate, in order to ensure that the data rate is not increased too quickly. For example, although the error rate may be acceptable at the selected rate, it is likely to decrease further at the next-lowest rate. Additionally, the next-lowest rate is likely to be less susceptible to fluctuations in then noise floor. Thus, in one embodiment, the Network Controller 120 selects the second-highest data rate that satisfies the criteria. Additionally, in at least one embodiment, the Network Controller 120 ensures that the network configuration does not change too-rapidly.

To do so, in one embodiment, the Network Controller 120 can select the rate that is immediately adjacent to the currently-supported data rate, in the direction indicated by the determined optimal rate. For example, suppose the current data rate is level four, and the optimal rate is determined to be level seven. In one embodiment, the Network Controller 120 selects level five as the recommended rate, to ensure the transition is smoother. The Network Controller 120 can then continue to iteratively evaluate the network and change the data rate, such that the transition to level seven occurs naturally over time.

In at least one embodiment, the Network Controller 120 schedules the next network test based on this determination. For example, suppose the Network Controller 120 ordinarily probes the network every hour, and the Network Controller 120 has determined that the optimal data rate is level seven, as compared to the current rate of four. In one such embodiment, the Network Controller 120 can suggest a rate of five, and schedule the next test to occur relatively sooner (e.g., in ten minutes) rather than waiting an hour. In this way, the Network Controller 120 can dynamically respond to shifting conditions relatively quickly, without making significant shifts at one time. The method 400 then continues to block 330 of FIG. 3.

Returning to block 435, if the Network Controller 120 determines that the error rate of the selected data rate does not satisfy the predefined criteria, the method 400 continues to block 445, where the Network Controller 120 determines whether there is at least one additional data rate yet to be evaluated. If so, the method 400 returns to block 430. In one embodiment, as discussed above, the Network Controller 120 iteratively evaluates progressively-lower data rates, until an acceptable bitrate is identified. If the Network Controller 120 determines that there are no additional data rates to be evaluated (e.g., even the lowest data rate does not have an acceptable error rate), the method 400 continues to block 330 of FIG. 3.

In one embodiment, in such a case, the Network Controller 120 can suggest the data rate be immediately lowered to the lowest possible setting. Further, in at least one embodiment, the Network Controller 120 notifies a user or administrator that the network is experiencing significant disruption or instability, even at the lowest data rate. This can allow the user to quickly intervene, if needed.

Figure 5:
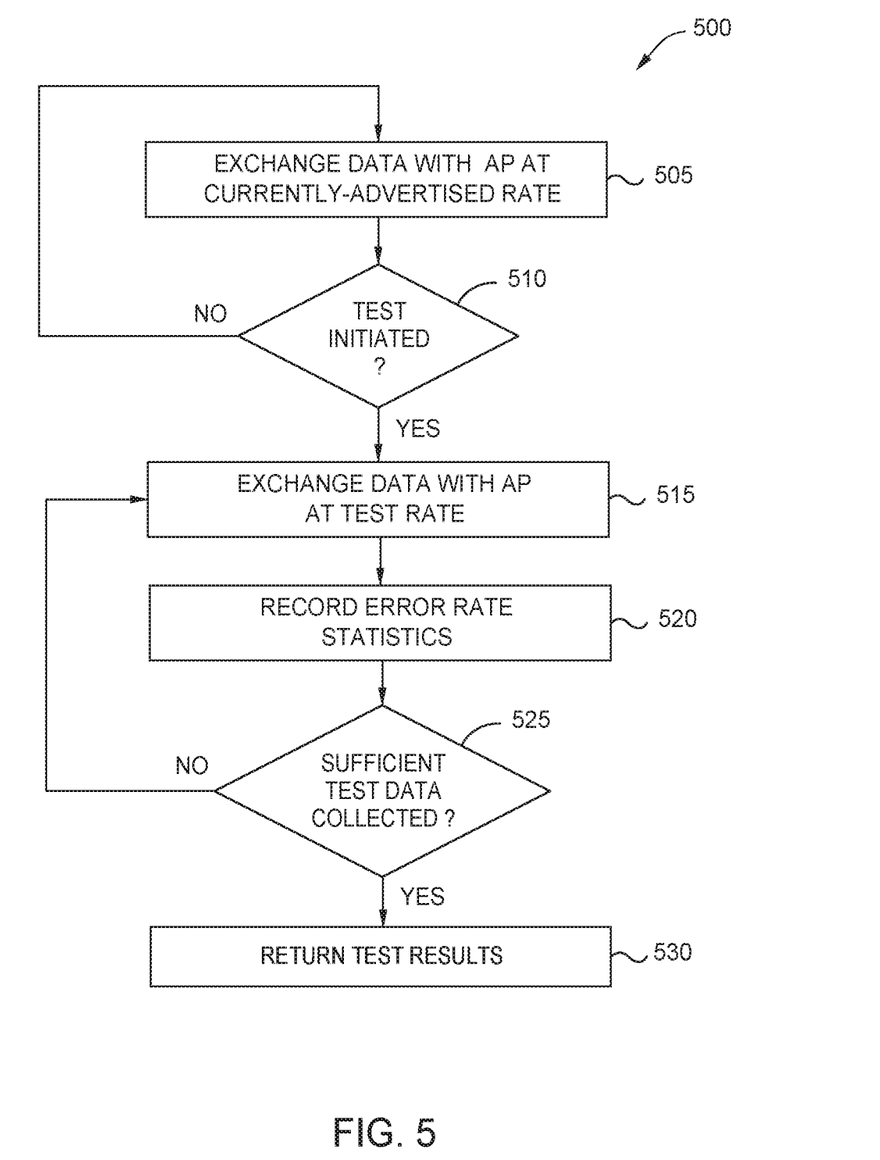
FIG. 5 is a flow diagram illustrating a method for performing evaluations to probe network characteristics, according to one embodiment disclosed herein.

FIG. 5 is a flow diagram illustrating a method 500 for performing evaluations to probe network characteristics, according to one embodiment disclosed herein. FIG. 5 begins at block 505, where a Sensor 115 exchanges data (e.g., packets) with one or more APs using the currently-advertised and supported data rate. That is, the Sensor 115 communicates with the AP at the data rate suggested or supported by the AP. At block 510, the Sensor 115 determines whether a test has been initiated or requested (e.g., by the Network Controller 120). If not, the method 500 returns to block 505, to loop until a test begins. If an evaluation has been requested, the method 500 continues to block 515, where the Sensor 115 exchanges data with the AP(s) indicated in the request using the data rate(s) specified in the request.

As discussed above, in one embodiment, the Sensors 115 are verified and/or authenticated in a way that allows them to force the APs to use a specified data rate, regardless of the currently-advertised rate. Thus, in the illustrated embodiment, the Sensor 115 exchanges packets using the specified rate, even while the AP continues to use the advertised rate to exchange packets with other devices (e.g., client devices). The method 500 then continues to block 520, where the Sensor 115 records performance statistics (e.g., error rate metrics) during this exchange.

At block 525, the Sensor 115 determines whether sufficient data has been collected. In one embodiment, this includes determining whether a defined number of packets and/or a predefined amount of data has been exchanged at the specified rate. In another embodiment, this includes determining whether a predefined period of time has elapsed while communicating at the specified rate. For example, the Network Controller 120 may instruct the Sensor 115 to exchange a number of packets, an amount of data, and/or for a period of time, to ensure accurate data is collected. If insufficient data has been collected, the method 500 returns to block 515. Otherwise, the method 500 proceeds to block 530.

In one embodiment, blocks 515, 520, and 525 are performed with respect to each specified data rate. That is, if the instruction from the Network Controller 120 specifies one or more data rates to be evaluated, the Sensor 115 performs blocks 515, 520, and 525 using each such data rate. In one embodiment, the Sensor 115 further performs blocks 515, 520, and 525 using the currently-advertised rate, regardless of the rate(s) specified in the request. Additionally, in at least one embodiment, the request simply instructs the Sensor 115 to initiate a test, without specifying data rates. In one such embodiment, the Sensor 115 can repeat blocks 515, 520, and 525 using the currently-advertised bitrate, as well as using the immediately adjacent rates (e.g., one step up and one step down). At block 530, the Sensor 115 returns the collected test results (for each evaluated data rate) to the requesting Network Controller 120.

Figure 6:
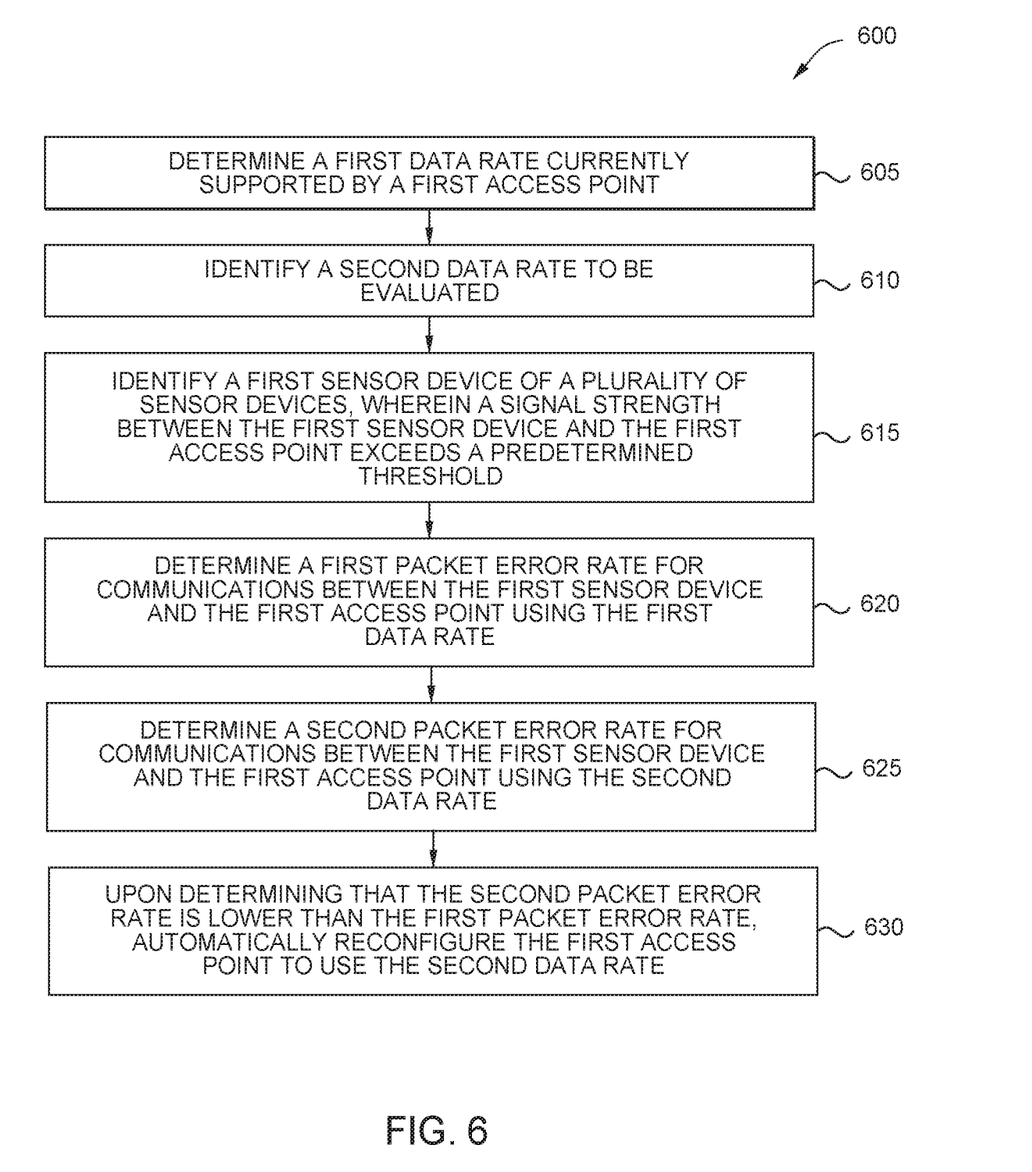
FIG. 6 is a flow diagram illustrating a method for network evaluation and adjustment, according to one embodiment disclosed herein.

FIG. 6 is a flow diagram illustrating a method 600 for network evaluation and adjustment, according to one embodiment disclosed herein. The method 600 begins at block 605, where a Network Controller 120 determines a first data rate currently supported by a first access point. At block 610, the Network Controller 120 identifies a second data rate to be evaluated. The method 600 then continues to block 615, where the Network Controller 120 identifies a first sensor device of a plurality of sensor devices, wherein a signal strength between the first sensor device and the first access point exceeds a predefined threshold. Further, at block 620, the Network Controller 120 determines a first packet error rate for communications between the first sensor device and the first access point using the first data rate. Additionally, at block 625, the Network Controller 120 determines a second packet error rate for communications between the first sensor device and the first access point using the second data rate. The method 600 then continues to block 630 where, upon determining that the second packet error rate is lower than the first packet error rate, the Network Controller 120 automatically reconfigures the first access point to use the second data rate.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
    determining a first data rate currently supported by a first access point;
    identifying a second data rate to be evaluated;
    identifying a first sensor device of a plurality of sensor devices, wherein a signal strength between the first sensor device and the first access point exceeds a predefined threshold;
    determining a first packet error rate for communications between the first sensor device and the first access point using the first data rate;
    determining a second packet error rate for communications between the first sensor device and the first access point using the second data rate; and
    upon determining that the second packet error rate is lower than the first packet error rate, automatically reconfiguring the first access point to use the second data rate.

2. The method of claim 1, wherein each of the plurality of sensor devices are authenticated, such that the plurality of sensor devices can instruct the first access point to communicate using data rates other than the first data rate currently supported by the first access point.

3. The method of claim 1, wherein determining the second packet error rate comprises:
    instructing the first sensor device to transmit a predefined number of packets to the first access point using the second data rate; and
    receiving test results from the first sensor device.

4. The method of claim 1, wherein the first packet error rate comprises a (i) beacon success rate defined based on a number of beacons heard compared to a configured beacon interval, and (ii) a retry rate defined based on a number of retries required to transmit data at the second data rate.

5. The method of claim 1, wherein automatically reconfiguring the first access point to use the second data rate is further performed based on:
    determining a third packet error rate for a second sensor device of the plurality of sensor devices, using the second data rate;
    aggregating the second and third packet error rates; and
    determining that the aggregated second and third packet error rates is lower than the first packet error rate.

6. The method of claim 1, the method further comprising iteratively evaluating each of a plurality of data rates by, for each respective data rate of the plurality of data rates, transmitting a predefined number of packets at the respective data rate.

7. The method of claim 6, wherein iteratively evaluating each of the plurality of data rates comprises:
    evaluating the first data rate currently supported by the first access point; and
    evaluating a data rate of the plurality of data rates that is immediately adjacent to the first data rate.

8. A non-transitory computer-readable storage medium containing computer program code that, when executed by operation of one or more computer processors, performs an operation comprising:
    determining a first data rate currently supported by a first access point;
    identifying a second data rate to be evaluated;
    identifying a first sensor device of a plurality of sensor devices, wherein a signal strength between the first sensor device and the first access point exceeds a predefined threshold;
    determining a first packet error rate for communications between the first sensor device and the first access point using the first data rate;

determining a second packet error rate for communications between the first sensor device and the first access point using the second data rate; and upon determining that the second packet error rate is lower than the first packet error rate, automatically reconfiguring the first access point to use the second data rate.

9. The computer-readable storage medium of claim 8, wherein each of the plurality of sensor devices are authenticated, such that the plurality of sensor devices can instruct the first access point to communicate using data rates other than the first data rate currently supported by the first access point.

10. The computer-readable storage medium of claim 8, wherein determining the second packet error rate comprises:
instructing the first sensor device to transmit a predefined number of packets to the first access point using the second data rate; and
receiving test results from the first sensor device.

11. The computer-readable storage medium of claim 8, wherein the first packet error rate comprises a (i) beacon success rate defined based on a number of beacons heard compared to a configured beacon interval, and (ii) a retry rate defined based on a number of retries required to transmit data at the second data rate.

12. The computer-readable storage medium of claim 8, wherein automatically reconfiguring the first access point to use the second data rate is further performed based on:
determining a third packet error rate for a second sensor device of the plurality of sensor devices, using the second data rate;
aggregating the second and third packet error rates; and
determining that the aggregated second and third packet error rates is lower than the first packet error rate.

13. The computer-readable storage medium of claim 8, the operation further comprising iteratively evaluating each of a plurality of data rates by, for each respective data rate of the plurality of data rates, transmitting a predefined number of packets at the respective data rate.

14. The computer-readable storage medium of claim 13, wherein iteratively evaluating each of the plurality of data rates comprises:
evaluating the first data rate currently supported by the first access point; and
evaluating a data rate of the plurality of data rates that is immediately adjacent to the first data rate.

15. A system comprising:
one or more computer processors; and
a memory containing a program which when executed by the one or more computer processors performs an operation, the operation comprising:

determining a first data rate currently supported by a first access point;
identifying a second data rate to be evaluated;
identifying a first sensor device of a plurality of sensor devices, wherein a signal strength between the first sensor device and the first access point exceeds a predefined threshold;
determining a first packet error rate for communications between the first sensor device and the first access point using the first data rate;
determining a second packet error rate for communications between the first sensor device and the first access point using the second data rate; and
upon determining that the second packet error rate is lower than the first packet error rate, automatically reconfiguring the first access point to use the second data rate.

16. The system of claim 15, wherein each of the plurality of sensor devices are authenticated, such that the plurality of sensor devices can instruct the first access point to communicate using data rates other than the first data rate currently supported by the first access point.

17. The system of claim 15, wherein determining the second packet error rate comprises:
instructing the first sensor device to transmit a predefined number of packets to the first access point using the second data rate; and
receiving test results from the first sensor device.

18. The system of claim 15, wherein the first packet error rate comprises a (i) beacon success rate defined based on a number of beacons heard compared to a configured beacon interval, and (ii) a retry rate defined based on a number of retries required to transmit data at the second data rate.

19. The system of claim 15, wherein automatically reconfiguring the first access point to use the second data rate is further performed based on:
determining a third packet error rate for a second sensor device of the plurality of sensor devices, using the second data rate;
aggregating the second and third packet error rates; and
determining that the aggregated second and third packet error rates is lower than the first packet error rate.

20. The system of claim 15, the operation further comprising iteratively evaluating each of a plurality of data rates by, for each respective data rate of the plurality of data rates, transmitting a predefined number of packets at the respective data rate.

* * * * *